United States Patent [19]

Briggs et al.

[11] 4,089,642
[45] May 16, 1978

[54] PORTABLE SPACE HEATER

[75] Inventors: Eugene C. Briggs, Bowling Green, Ky.; Shekhar Chakrawarti, Strongsville, Ohio; William C. Wellbaum; Robert F. Shaftner, both of Bowling Green, Ky.

[73] Assignee: Koehring Company, Milwaukee, Wis.

[21] Appl. No.: 682,577

[22] Filed: May 3, 1976

[51] Int. Cl.$^2$ .......................... F23D 11/04; F24H 3/02
[52] U.S. Cl. .................................... 432/222; 432/223; 126/110 B; 336/145; 310/68 D
[58] Field of Search ...................... 432/222, 223, 224; 126/110 B, 110 C, 110 D

[56] References Cited
U.S. PATENT DOCUMENTS

| 2,744,516 | 5/1956 | Hubbard | 126/110 B |
| 3,319,947 | 5/1967 | Truesdall | 432/223 |
| 3,401,920 | 9/1968 | Berkhoudt et al. | 432/223 |
| 3,706,446 | 12/1972 | Briggs | 432/224 |
| 3,883,290 | 5/1975 | Windelbandt | 432/223 |

Primary Examiner—John J. Camby
Assistant Examiner—Henry C. Yuen
Attorney, Agent, or Firm—Jerome P. Bloom

[57] ABSTRACT

The space heater of the invention features an improved motor-transformer package which may be easily applied to and removed from the heater, as an integrated unit. The design and mount of this package makes it extremely easy to service and insures that in the placement and operation thereof the total package will be surrounded with an insulating flow of air, the cooling effect of which guarantees a longer and more useful operating life for the included components and related apparatus. In the preferred embodiment illustrated, the motor and transformer elements of the package are connected, in a superposed relation, to opposite sides of a mounting plate the design of which essentially dictates the required placement of the package in a heater housing.

The invention also features an improved transformer characterized by a plurality of windings which are series related in a manner to make the transformer significantly less susceptible to overheating or short circuiting than would be the case in the use of comparable conventional transformers.

20 Claims, 6 Drawing Figures

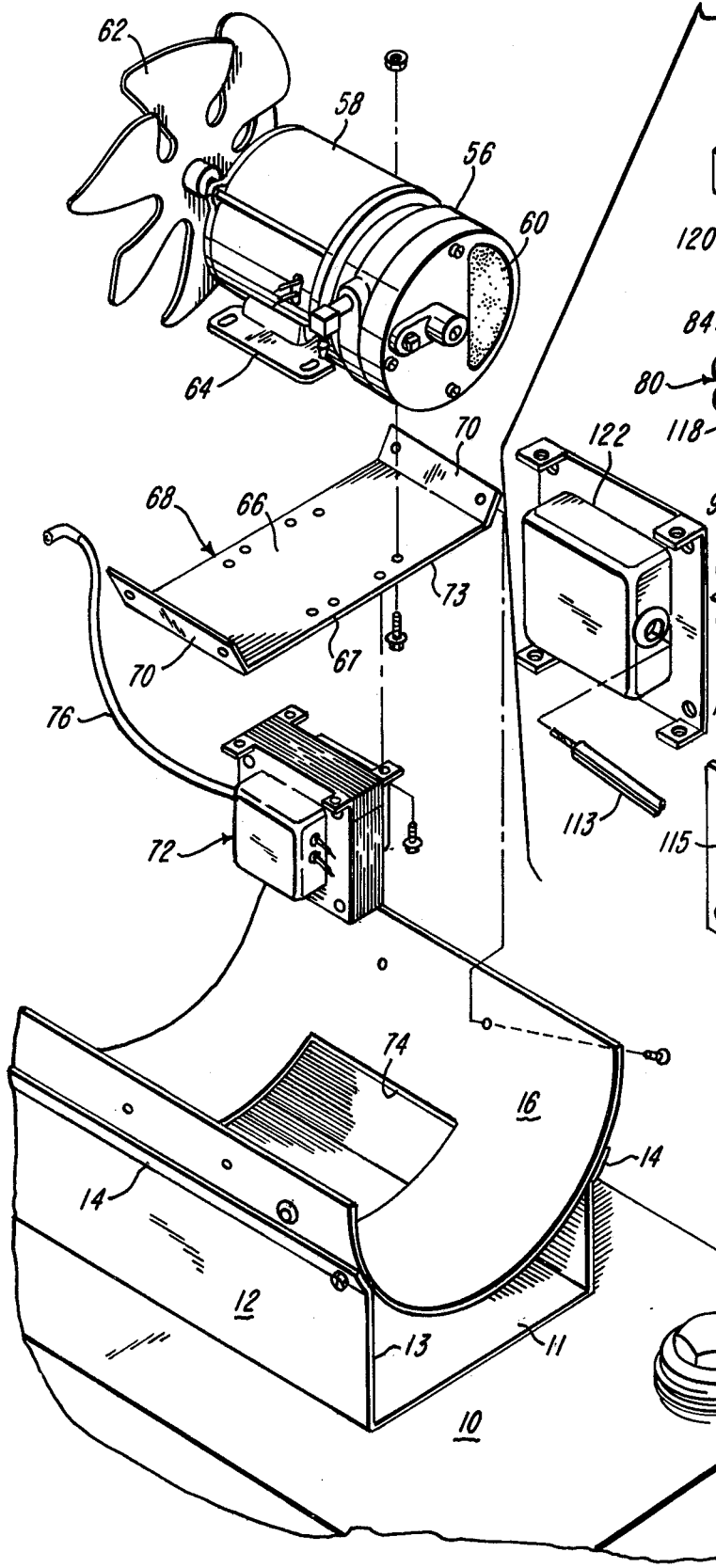
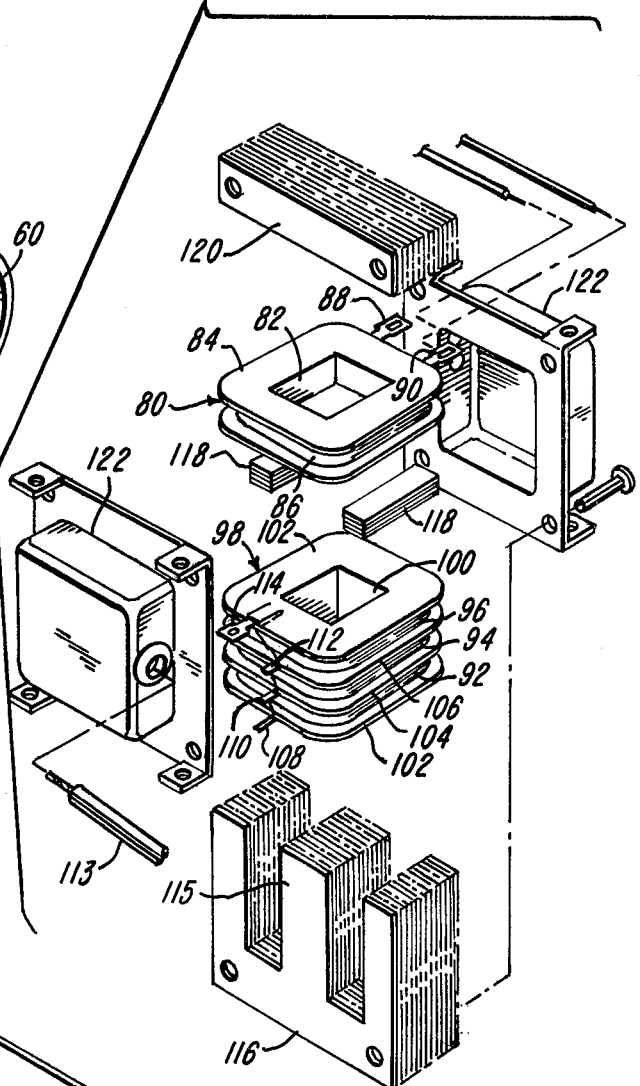

PORTABLE SPACE HEATER

BACKGROUND OF THE INVENTION

This invention relates to improvements in portable type heaters enabling such heaters to be operated in a safer and more effective manner, with less chance of malfunction and with greater reliability in their performance.

It is extremely important in the operation of portable space heaters that an adequate spark be provided to insure immediate combustion, as and when required, and that they be guaranteed a continuous supply of power when left untended as is frequently the case.

Difficulties are often experienced in efforts to maintain the ignition system of portable space heaters so as to provide the proper spark after repeated or through extended periods of use. It has proven even more difficult to keep an included transformer in a condition to avoid overheating and short circuiting, both of which conditions produce malfunction and can result in property damage. The extent of such damage will depend on the application of the heater and can, of course, reach serious proportions. In the event any one of the noted undesirable events occurs, there are obvious dangers the least of which is damage to the components of the heater. It is to the solution and avoidance of these problems that the present invention is directed.

SUMMARY OF THE INVENTION

The improvements of the present invention are achieved, primarily, by an improved mount and construction of a motor-transformer unit, an essential component of a portable space heater. Such unit is installed in a particularly distinctive manner and incorporates an uniquely constructed transformer.

While the invention provides a particularly improved space heater, it will be readily apparent that the inventive components can be advantageously applied to other uses with similar beneficial results.

A preferred composition of the motor-transformer unit herein disclosed includes a mounting plate supporting on one face thereof a motor and on the opposite face thereof a transformer directly aligned with the motor.

The transformer of the present invention features windings the secondary of which is comprised of separate series related coils. An important result of this arrangement and construction is a severe restriction of the exposure of the high voltage portion of the secondary windings, thereby minimizing the chance of overheating and short circuiting which often occurs in the use of conventional transformers in portable heaters.

In addition to the foregoing, the invention embodiment provides a mount of a transformer in a portable heater which insures its maximum exposure to a flow of cooling air. The construction and arrangement provided will in many cases enable the use of a transformer of a more economical construction than heretofore possible.

A primary object of the invention is to provide improvements in portable heater components and methods of their construction enabling them to be economically fabricated, more efficient and satisfactory in use, adaptable to a wide variety of applications and less likely to malfunction.

A further object is to provide a power package for portable space heaters and like units which is simply designed and safer in its use.

Another object is to provide transformers the construction of which makes them particularly advantageous for use in portable space heaters.

An additional object is to provide an improved motor-transformer unit which may be simply installed in a portable space heater so as to be cooler and safer in operation.

Another object is to provide a motor-transformer unit and/or a portable space heater embodying the same possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein one but not necessarily the only form of the embodiment of the invention is illustrated, FIG. 1 is a side elevation of a portable space heater which embodies the invention improvements;

FIG. 5 illustrates an exploded view of the motor-transformer unit embodied in the heater; and FIG. 6 is an exploded view of the improved transformer of the present invention.

Like parts are designated by like numrals throughout the several views.

The improvements of the present invention are shown as embodied in a portable space heater of the type illustrated in co-pending application for U.S. Ser. No. 603,038, entitled PORTABLE HEATER.

Those features which exist in the prior art are herein described and illustrated only to the extent necessary for an understanding of the improvements the present invention contributes to space heaters and like powered equipment.

Figure 1:
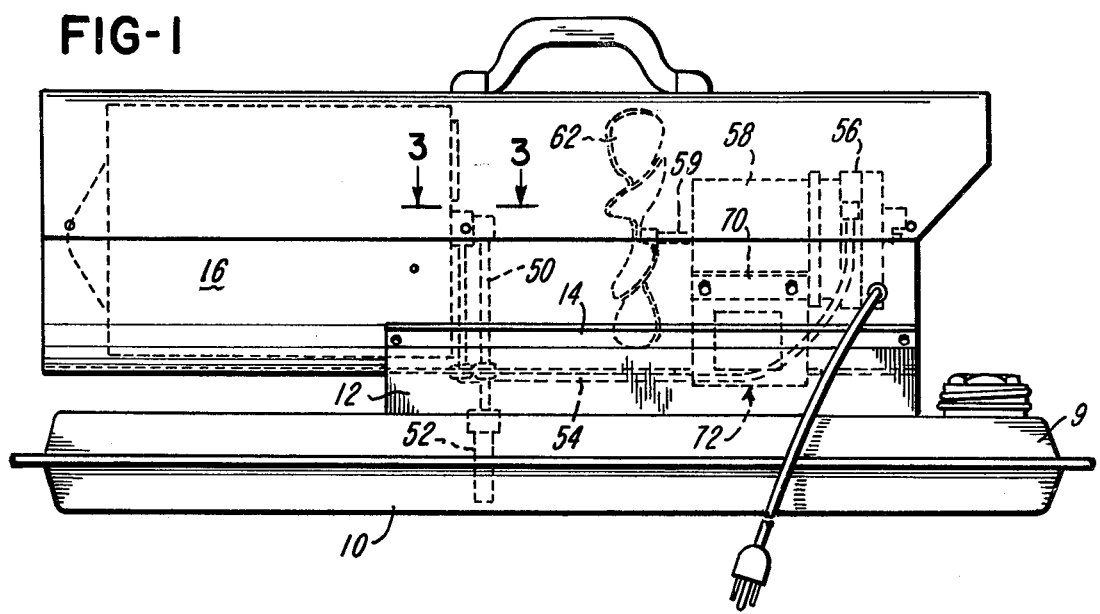
Figure 2:
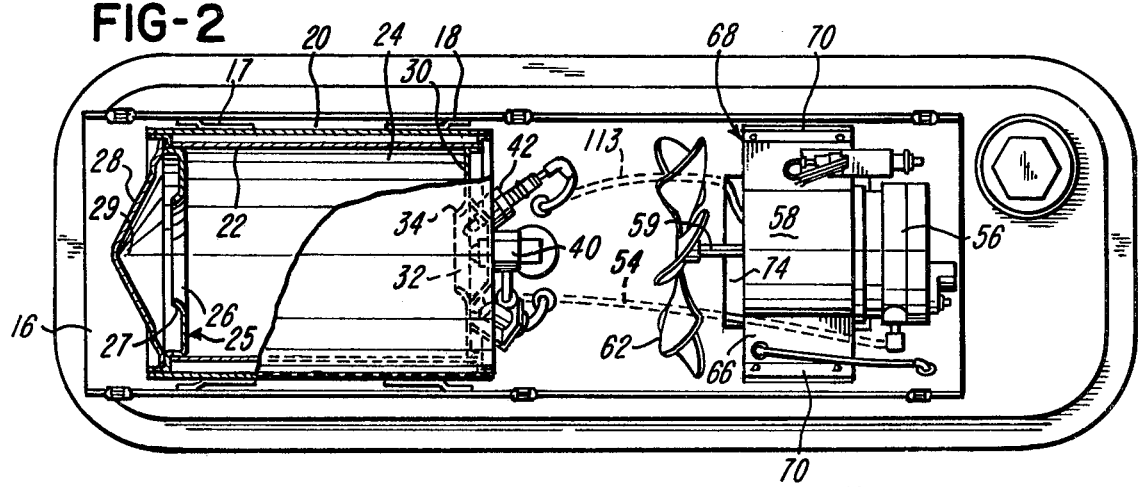
FIG. 2 is a top view of the heater shown partly in section.
Figure 4:
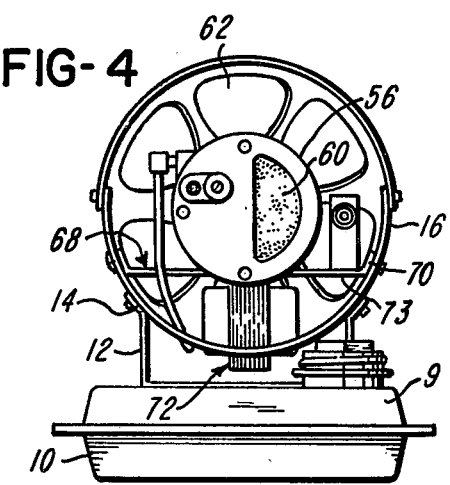
FIG. 4 is a rear end view of the heater.

The heater illustrated comprises a fuel tank 10 having a generally rectangular oblong shape. Fixed on the upper surface of tank 10, offset toward what may be considered its rear end 9, is the base 11 of a longitudinally extending support element 12 which is generally U-shaped in transverse section. The legs 13 of the "U," which project upwardly from and generally perpendicular to the tank 10, have their upper ends bent outwardly to form thereon transversely aligned divergent portions 14 providing a saddle type seat for a generally cylindrical tubular housing 16. Housing 16 is illustrated to be comprised of upper and lower half sections which are releasably connected. It will be seen, however, that a particular segmented form of the housing is not required for the practice of the invention. Noting FIGS. 1 and 5, the saddle provided by the support 12 has a longitudinal extent approximately one half that of the tank 10 and its rearmost end is adjacent the tank's rear end 9. The rearmost end of housing 16 is aligned with the rearmost end of the support 12 will its forwardmost end projects beyond the support 12 to extend in adjacent but spaced, elevated relation to and the length of the forwardmost end of the tank 10.

Mounted within and positioned in concentric spaced relation to the forward end portion of the housing 16, by radial brackets 17, is a tubular member 20. Positioned within the member 20, similarly in concentric spaced relation thereto, is a further tubular member 22 forming the peripheral wall of a combustion chamber 24. The outermost end of the chamber 24 is bridged by a plate 25 constructed to provide a support for the forward end of the tubular member 22 and to include a central aperture 26 rimmed by a forwardly projected convergent flange 27. The plate 25 has circumferentially spaced radial projecting portions at its periphery which mounts it in bridging relation to the forwardmost end of the tube 20. The plate 25, in turn, mounts to the outer side thereof a plate 28 the center of which is dished outwardly therefrom to form an afterburner chamber 29 which receives the discharge from the combustion chamber by way of aperture 26. This discharge normally contains unburned elements of fuel and the afterburner chamber provides an environment wherein the burning thereof may be completed prior to their discharge with gases of combustion to the atmosphere. The apex of the conically and outwardly projected central portion of plate 28 is arranged to be in direct alignment with the central axis of the combustion chamber and the aperture 26. Suitable apertures are provided for escape of the gases as well as for the flow of heated air from the forward end of the passage defined between the tubular members 20 and 22.

Figure 3:
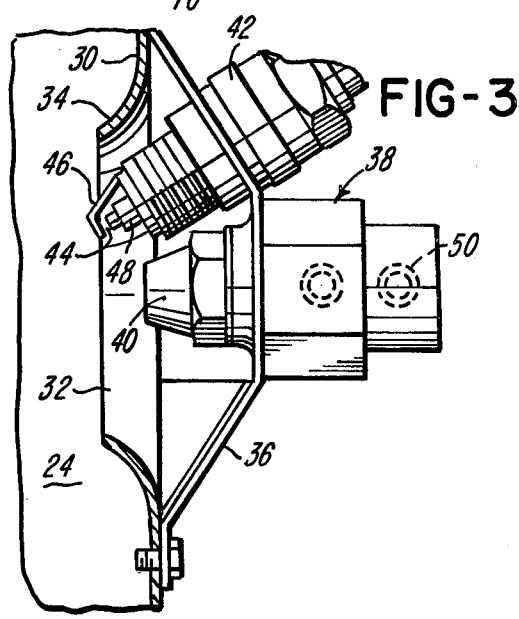
FIG. 3 is a view taken on line 3—3 of FIG. 1.

The tube 22 which defines the combustion chamber 24 has its innermost end bridged by a plate 30 including a central aperture 32 rimmed by a conically convergent flange portion 34 directed inwardly of the combustion chamber. A bracket 36 (see FIG. 3) is mounted to bridge the aperture 32 in a diametral sense, at the rear or outermost face of the plate 30. Suitably connected to the bracket 36 is a burner head 38. The latter mounts a nozzle 40 which is projected forwardly of and through a central aperture in the bracket 36. The discharge end of nozzle 40 projects within the aperture 32 to position in generally coaxial alignment with the aperture 26. Also mounted in and projected through the bracket 36 is a spark plug 42 the electrodes 46 and 48 of which form a spark gap which is positioned adjacent the discharge end of the nozzle.

In the embodiment illustrated nozzle 40 is an aspirating type nozzle having a central fuel passage communicating with tank 10 by way of a coupled tubing 50 extending through an opening in the bottom of the housing 16, which tubing is coupled to a filter 52 fixed to depend within the tank and to open to the contents thereof adjacent its bottom. Nozzle 40 is conventionally provided with air passages intersecting the discharge end of the fuel passage to provide for the delivery therethrough of air under pressure sufficient to aspirate the fuel to and through the fuel passage and from the tank 10 and to deliver it in an atomized condition in the area of the aperture 32. As illustrated, this atomizing air is delivered to the nozzle by way of a tube 54 leading from a compressor 56. The latter is connected to be integral with and to form an extension of one end of a motor 58 positioned centrally of the rearmost end of the housing 16. Details of the compressor and the nature and connection thereof to the rearmost end of the motor 58 may be seen with reference to U.S. Pat. No. 3,101,193. Such details are not here described since they form, per se, no part of the present invention. All that needs be here said is that the compressor embodies a vaned rotor constructed and connected in known manner to the drive shaft of the motor 58 and functioning in the operation thereof to draw air from the environment of the motor by way of a filter 60 to compress the same and discharge it from the compressor, by way of the tube 54, to serve as described. The end of the motor drive shaft opposite that mounting the rotor has an extension 59 projected forwardly of the motor, within the housing 16, to which is fixed a fan assembly 62. The latter radially projects to substantially bridge the housing 16.

The foregoing detailed structural description provides an environment for the improvements of the present invention, the features of which will now be more particularly described.

Referring to FIGS. 5 and 6 of the drawings, the base 64 of the motor 58 is fixed centrally of the upper surface 66 of an oblong plate 68 the major dimension of which extends transversely to the direction of the longitudinal axis of the motor. The portions of the plate 68 which project laterally of the motor 58 terminate in upwardly and outwardly divergent end sections 70. The sections 70 are formed to seat to directly opposite inner wall surface portions of the housing 16 and to have the plate portion 67 intermediate the end sections 70 orient in a horizontal position.

Fixed to depend from the undersurface 73 of the plate 68, at its center, is a transformer 72. As so related, the motor-compressor-fan (58, 56, 62), the plate 68 and the transformer 72 are thereby integrated to provide a unitary structure which may be easily and quickly applied in the rearmost end of the housing 16. The housing 16 has a large rectangular opening 74 in its bottom, directly under and in alignment with the required position of the transformer. The lower portion of the transformer depends within and is so arranged as to have a substantial spacing from the edge portions of opening 74. As may be seen in the drawings, while the transformer has its lowermost portion arranged to depend through the opening 74, it does so only to a slight degree, leaving the bottom of the transformer elevated from and in spaced relation to the base 11 of the support 12. By virtue of the integrated superposed relation of the motor 58 and the transformer 72, to opposite sides of the plate 68, and by virtue of the lateral extent of the plate 68, the motor 58 will position in a sense coaxial to the longitudinal axis of the housing 16 and both the motor and the transformer are substantially spaced from and clear of the housing and the fuel tank 10. Of course, the plate sections 70 will be secured to the inner surface of the wall defined by the housing 16 by conventional releasable connectors. Easy access to the motor-transformer unit is thus provided which facilitates servicing or removal as a whole.

As noted, the arrangement and mounting enabled by the motor-transformer package here provided clears the transformer from any structure from which it may require heat and to which it may transfer heat in the function thereof. It will be seen, moreover, that as the motor 58 is energized, the fan 62, tip portions of which project radially outward of the peripheral limits of the motor-transformer unit, will develop an axial flow of air not only moving to and about the combustion chamber 24 and through the surrounding passage defined between the tubular members 20 and 22 but producing a condition such that the flow in advance of the combustion chamber will enter the rear end of the housing 16 in an accelerated movement about and over the transformer, the motor, and the intermediate plate to which they mount. The insulating layer of air thereby provided achieves a maximum and continuous cooling effect which not only substantially eliminates the danger of overheating the transformer in a long period operation of the motor but insulates the same from the tank 10 and its contents. The result is the obtaining of an unexpected safety factor, an optimal level of function and insured reliability of performance of the motor-transformer unit and related components. The maintenance of a relatively uniform operating condition of the transformer is important not only to the transformer but to the function of the ignition system of the heater. This may be well understood since the maintenance of a continued operation of the heater is dependent on the production of an electric arc required to be fired constantly between the electrodes 46 and 48 of the spark plug 42. With a conventional arrangement of a motor and transformer in a portable heater, the overheating and/or short circuiting which so often occurs can affect the output thereof, the consequence of which is improper ignition or lack of ignition. In either case, the results are obviously undesirable. With the present invention the chance of this is reduced significantly. A further benefit of the arrangement provided is that it avoids the exposure of the fuel tank to a potential immediate and dangerous source of heat.

FIG. 6 illustrates a preferred embodiment of the transformer 72 lending special benefits in utilizing the features of the present invention in the application described. As shown, in this case the primary of the transformer is provided by a single wire wound on a bobbin 80 while the secondary is wound on a bobbin 98 and comprises a plurality of wires which are individually wound and series related. The bobbin 80 is provided by a rectangularly configured tubular spool base 82 formed at each of the respective ends thereof to include an identical rectangularly configured integrally connected external flange 84 which also has a generally rectangular configuration. The flanges 84 which define the longitudinal limits of the spool base 82 project outwardly of the base to a substantial degree. A single wire is wound about the base 82 in a manner to extend from a close fitting abutment with one flange 84 to close fitting abutment with the opposite end flange 84 as it is applied in continuous fashion to produce a plurality of layers thereof in an obvious manner. The winding of the single wire is distinguished by a particular absence of any material being interleaved between the successive layers. A primary winding 86 for the transformer 72 is so provided. Note that the outer surface of the winding 86 is substantially recessed relative the projected confining end flanges 84. Thus, the wire of the winding 86 is simply wound directly on itself, in a highly compact fashion, minimizing the volume of the space which it occupies. The two terminals of the primary winding 86 to which the respective inner and remote outer ends of the winding are connected are respectively identified as 88 and 90. These terminals are both anchored, in side by side spaced relation, in connection with and projected outwardly from the same peripheral side edge portion of one of the flanges 84.

The secondary of the transformer 72 is comprised of a plurality of windings 92, 94 and 96, each being provided by a single wire individually and separately wound on a different section of the bobbin 98. The latter has a rectangular tubular base portion similar to but of greater longitudinal extent than that of the bobbin 80. In connection with each of the respective ends of the tubular base of the bobbin 98 is an integral flange 102 which has a generally rectangular configuration. Also formed integral with the tubular base portion of the bobbin 98, intermediately of the flanges 102 and in respectively equi-distantly spaced relation thereto, are further external flanges 104 and 106. The latter divide the base of the bobbin 98 into three sections of equal length. Anchored in and projected from the center of one side edge of the outer periphery of one flange 102 is a terminal 108 to which is connected one end of the winding 92. As previously mentioned, the winding 92 is comprised of a single wire wound in successive layers the respective ends of which are on the one hand each in tight abutting relation to the flange 102 anchoring the terminal 108 and on the other hand in tight abutting relation to the adjacent flange 104. This wire is wound on itself to form tightly superposed layers thereof, the arrangement being similar to the winding of the wire forming the primary 86. In this case also, there is no interleaved material and no spaces left in the compact winding or to either end thereof in which moisture or dirt may be lodged or accumulated. The outermost end of the wire forming the winding 92 positions remote from the end of the wire connected to terminal 108 and is connected to a terminal 110 which is aligned with the terminal 108 and anchored in and projected from an outer side edge of the flange 14. The single wire forming the winding 94 is wound exactly as that forming the winding 92 with one end thereof extending from the inner layer to connect to the terminal 110 and the outer remote end thereof connected to a terminal 112 anchored in and projected from an outer side edge of the flange 106. Terminal 112 is also aligned with the terminal 108.

The winding 94 is accordingly wound tightly in superposed layers, and in tight abutment, at the respective ends of its layers, with the flanges 104 and 106. It is also characterized by an absence of interleaved materials, thereby inhibiting dirt and moisture from accumulating within or about the winding. The single wire of winding 96 has one end which extends from the innermost layer of the winding to connect to the terminal 112. This wire is wound on itself exactly as the wires of the respective windings 92 and 94, between and in tight abutting relation to the flange 106 and the adjacent flange 102, and the end thereof remote from that connected to terminal 112 is connected to the terminal 114 anchored in and projected outwardly from the side edge of the flange 102 most adjacent the flange 106. Terminal 114 is positioned to align with terminals 108, 110 and 112.

The secondary of the transformer is arranged to have a suitable ground connection with the terminal 108 and its output is directed from the terminal 114 through a lead 113 providing a connection of the spark plug 42 to the output of the transformer.

A common magnetic circuit is provided to mount the bobbins 80 and 98, said circuit being comprised of E-shaped thin metal plates 116 stacked to provide a laminated core and completed by a series of similarly stacked thin, elongate, generally rectangular plates 120 as such stack is placed across the open side of the E and in contact with the projected ends of leg portions thereof, the central one of which is defined by the numeral 115. Attention is directed to the fact that the bobbins are formed of an insulating material, for example nylon. In assembly of the bobbins the bobbin 98 is first threaded over the leg segment 115 of the E-shaped stack of plates 116. The central passage 100 defined by the base portion of bobbin 98 has a dimension such that the bobbin closely fits about the leg 115. The central passage provided in bobbin 80 is similar in cross section to the passage 100 and the bobbin 80 is also threaded over the leg portion 115, in the process of which two stacks of thin metallic rectangular plates 118 are positioned between the respectively adjacent faces of the bobbins 80 and 98. The stacks of plates 118 position in contact with respectively opposite sides of the leg 115 on the one hand and the inner surfaces of the remote leg portions of the stack of E-shaped plates 116 on the other. In the application of the bobbins 80 and 98 the flange 84 which is outermost in respect to the assembly of the bobbins on the leg 115 is that which mounts the terminals 88 and 90. The flange 102 of the secondary bobbin 98 which is positioned most adjacent the bobbin 80 mounts the output terminal 114. The bobbin assembly so provided has a depth in conformance with the length of the leg 115 and once positioned is followed by an application of the stack of plates 120. The transformer is completed by the application of two exterior cup-shaped housing plates 122 brought together in a conventional manner to cap outer opposite sides of the transformer assembly comprised as described. The cup portions of the respective housing elements 122 are sized to provide that they position immediately about the insulating flange portions of the bobbins which project from the opposite faces of the stacked plates providing the magnetic circuit for the transformer. About the mouth of each cup-shaped housing is a flange which superposes the adjacent face of the stacked plates 116 and 120. The whole is locked together by fasteners thrust through aligned openings provided at the corners of the flanges in connection with the cup-shaped housing 122, the stack of E-shaped plates 116 and the stack of bridging plates 120. Prior to the assembly of the housings 122 potting compound is applied, essentially limited, as far as the bobbins are concerned, to the areas between the respective flange portions of each bobbin.

Note that the bobbins 80 and 98 by reason of their construction not only provide a compact arrangement for the windings and effectively insulate the windings, one from the other, but they essentially determine the size and configuration of the transformer. The frame defining the core and magnetic circuit of the transformer, in conjunction with the configuration of the bobbins, simplifies transformer assembly.

The transformer construction described is uniquely advantageous both for the effecting of a highly reliable power package and an improved space heater. It is one that has significant benefits, particularly as a high voltage transformer, by reason of the arrangement of the separately wound wires of the secondary and their series relation. The result of this feature is a transformer having a stepped secondary wherein the degree of exposure of the wires providing the highest voltage is relatively limited, in this case to the area of the secondary windings defined between the flange 106 and the most adjacent flange 102. As will be readily apparent, in an application such as described wherein 5100 volts is the end objective, the invention enables a differential voltage from one wire to the other of the respective windings 92, 94 and 96 to be such as not to exceed 1700 volts, or one-third of maximum voltage. This provides a construction which is radically different from a conventional secondary wherein the total outside winding of the secondary would normally exhibit an output voltage the level of which would be approximately 5100 volts.

By reason of the division of the secondary winding as described, there is significantly less chance of overheating in operation of the transformer and the related apparatus and consequently a substantial protection against short circuiting. The advantage of this is self-evident. When considering this type of transformer in conjunction with a motor-transformer unit as previously described and in particular the nature and facility of the mount thereof in a portable space heater, the possibility of overheating and short circuiting is rendered even more remote.

Further advantage found in the construction of a transformer as described, particularly when an embodiment thereof is to be applied in connection with a portable space heater, is that there need be only a limited amount of potting material and a bake and dip process for the windings is unnecessary. By reason of the nature of the individual windings of the primary and secondary of the transformer, undesirable moisture and dirt, inadvertently included or created or otherwise, is eliminated to all intents and purposes.

Considering further the mount of the transformer unit as described and the inherent insurance of a continuing flow of cooling air in operation of a space heater in which the transformer is embodied, one can see the extreme importance of the invention components in all respects, and particularly in combination.

To summarize, the composition of the described transformer enables that the same may be made smaller, more compactly and more economically and enables the application thereof as an important adjunct to a space heater and like apparatus. In use of the transformer maintenance and servicing problems are considerably reduced.

Results indicate that in spite of their simplicity, the invention improvements produce heretofore unobvious advances in the art.

It should be readily apparent as to the manner in which leads and connections may be made to couple the transformer described to the related elements including the motor and spark plug and to provide in connection with the circuit so established a plug which may be applied to any suitable receptacle providing a source of electric power.

From the above description it will be apparent that there is thus provided a device of the character described possessing the particular features of advantage before enumerated as desirable, but which obviously in susceptible of modification in its form, proportions, details construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A portable space heater including means defining a combustion chamber having a fuel tank in connection therewith, means for delivering fuel from said tank to said chamber, means effective on energization thereof to ignite the delivered fuel for burning thereof in said chamber, means the operation of which is effective to deliver air to and about said combustion chamber to support combustion and be heated thereby, means for energizing the ignition means and operating the air delivery means, a housing peripherally encompassing said means defining said combustion chamber and forming therewith a passage for air delivered about said combustion chamber to be heated thereby, said housing having an opening to each of its opposite ends which respectively include an air inlet to and an air outlet from said housing, characterized by a motor and a transformer embodied in said heater, a support plate connected with and extending transversely of said housing in the vicinity of said air inlet, said motor and said transformer being connected to said support plate, said motor being mounted on and over said supported plate and said transformer being dependent from said support plate and clear of said housing wall structure and any underlying structure, generally in line with and to the rear of said combustion chamber, said motor and transformer providing said energizing and operating means for said ignition and said air delivery means when suitably connected to a source of power, the construction and arrangement of said support plate and the mounting of said motor and transformer thereon providing that on connection of said motor and transformer to a source of power, said air delivery means will induce a flow of air to move to, through and from said housing and in the process produce an insulating layer of air moving in enveloping relation to the motor and transformer, said layer of air being effective to separate the motor and transformer from said housing and adjacent structure except for the connection afforded by said support plate.

2. A portable space heater as in claim 1 wherein said support means comprises a plate-like element the lateral extremities of which are inclined relative the intermediate portion of said plate to provide a bearing mount of said plate on and within said housing.

3. Apparatus as in claim 2 characterized in that said lateral extremities of said plate are configured for a slip fit placement of said plate on circularly spaced portions of an arcuate wall surface forming part of the interior wall surface of said housing.

4. A portable space heater including means defining a combustion chamber having a fuel tank in connection therewith, means for delivering fuel from said tank to said chamber, means effective on energization thereof to ignite the delivered fuel for burning thereof in said chamber, means the operation of which is effective to deliver air to and about said combustion chamber to support combustion and be heated thereby, means for energizing the ignition means and operating the air delivery means, a housing peripherally encompassing said means defining said combustion chamber and forming therewith a passage for air delivered about said combustion chamber to be heated thereby, said housing having an opening to each of its opposite ends which respectively include an air inlet to and an air outlet from said housing, characterized by a motor and a transformer embodied in said heater, support means connected with said housing and mounting said motor and said transformer in a position in the vicinity of said air inlet and clear of said housing wall structure and any underlying structure, generally in line with and to the rear of said combustion chamber, said motor and transformer providing said energizing and operating means for ignition and said air delivery means when suitably connected to a source of power, the construction and arrangement of said support means and the mounting of said motor and transformer thereon providing that on connection of said motor and transformer to a source of power, said air delivery means will induce a flow of air to move to, through and from said housing and in the process produce an insulating layer of air moving in enveloping relation to the motor and transformer, said layer of air being effective to separate the motor and transformer from said housing and adjacent structure except for the connection afforded by said support means, said housing being a tubular shell which has its air inlet end projected beyond and rearwardly of said means defining said combustion chamber, said motor and transformer being connected to horizontally oriented plate means mounted on and in connection with said shell to provide said support means, said housing being mounted on and in spaced relation to said fuel tank by plate-like segments which provide for its support, and said transformer depending from said plate means to the bottom of said shell, which shell has an aperture aligned with said transformer the edges of which are free and clear of said transformer and in spaced relation thereto.

5. A portable space heater including means defining a combustion chamber having a fuel tank in connection therewith, means for delivering fuel from said tank to said chamber, means effective on energization thereof to ignite the delivered fuel for burning thereof in said chamber, means the operation of which is effective to deliver air to and about said combustion chamber to support combustion and be heated thereby, means for energizing the ignition means and operating said air delivery means, a housing peripherally encompassing said means defining said combustion chamber and forming therewith a passage for air delivered about said chamber to be heated thereby, said housing having openings to each of its opposite ends which respectively include an air inlet to and an air outlet from said housing, a motor and a transformer embodied in said heater mounted by support means generally in line with and to the rear of said combustion chamber, said motor and transformer providing said energizing and said operating means for said ignition and said air delivery means when suitably connected to a source of power, the motor and transformer being located in the vicinity of said air inlet and being held by their support means in an elevated relation to and substantially clear of underlying structure and adjacent surfaces and to provide substantially free passage for air to move thereby to opposite sides thereof whereby on connection of said motor and transformer to a source of power, said air delivery means will induce a flow of air to move to, through and from said housing and in the process produce an insulating layer of air moving in enveloping relation to the motor and transformer, said layer of air being effective to separate the motor and transformer from said housing and adjacent structure except for the connection afforded by said support means, said housing being a tubular shell-like structure, and said support means extending transversely of said shell-like structure adjacent said inlet and having the form of a plate which projects laterally to each of respectively opposite sides of said motor and transformer, the lateral extremities of said plate providing means for the connection thereof to said shell-like structure and said motor and said transformer mounting to respectively opposite sides of said plate.

6. A portable heater as in claim 5 characterized in that the projected lateral extremities of said plate are formed to predetermine the position of said plate, in a horizontal attitude thereof, on placement thereof within the wall structure defined by said shell-like housing and said transformer is connected to said plate at a location centered between its lateral extremities and to depend therefrom.

7. A portable space heater as in claim 5 wherein said transformer unit includes wire means formed into primary and secondary windings and mounting means for said windings including means defining a magnetic circuit characterized in that said secondary includes wire means divided into a plurality of segments and each of said segments is comprised of a section of said wire means separately wound into a plurality of superposed layers.

8. A portable space heater as set forth in claim 7 characterized in that in said transformer unit each of said segments is formed of a single wire wound on itself and said segments are interconnected in series relation.

9. A portable space heater as in claim 8 characterized in that in said transformer unit said segments are separated by insulating means and interconnected through the medium of terminals in connection with interposed portions of said insulating means.

10. A portable space heater as set forth in claim 7 characterized in that in said transformer unit bobbin means provide a mount for said windings, said primary winding being wound about one of said bobbin means and contained thereby, the secondary of said winding means being wound on other of said bobbin means and contained thereby and said means defining a magnetic circuit mounting the bobbin means which respectively contain the primary and the seconary of said windings in end spaced relation and said segments of said secondary are mounted in end spaced relation by said other of said bobbin means and interconnected one to the other in series relation.

11. Apparatus as in claim 10 characterized in that said other of said bobbin means is a single bobbin divided into three sections by peripherally projected longitudinally spaced flanges, and terminals in connection with said flanges provide for series connection of one of the other of said segments of said secondary.

12. Apparatus as in claim 10 characterized in that said means defining a magnetic circuit is comprised of a plurality of E-shaped metallic plates stacked in a series providing the mount of said bobbin means in end spaced relation within the confines thereof and on the central leg of the laminated core provided thereby and a complementary series of generally rectangular thin metallic plates stacked in series fixed in bridging relation to the open side of said stacked E-shaped plates.

13. Apparatus as in claim 10 characterized in that said bobbin means are comprised of a base spool portion having a tubular form and a generally rectangular cross section and, integrally formed therewith, longitudinally spaced flanges providing for independent containment of said windings and the respective segments thereof.

14. Apparatus as in claim 13 characterized in that on said transformer unit the outer layers of said windings are recessed relative the flanges between which they nest and to which they tightly abut, laminated metallic means are interposed between said end spaced bobbin means and respectively between the inner and the outer legs of said stacks of E-shaped plates, potting means is provided above said windings and within the limits of said flanges of said bobbin means and cup-like housing elements configured to immediately nest portions of said bobbin means which project from respectively opposite faces of the means defining said magnetic circuit provide an enclosure for said bobbin means and include portions accommodating fastening means to fix the same to the stacked plates of the means defining the magnetic circuit, in capping relation to the respectively opposite outside faces thereof.

15. A portable space heater as in claim 5 wherein said plate has a longitudinal extent in the direction of the motor drive shaft which is limited and said plate is laterally extended with reference to said motor and transformer and its lateral extremities are provided with configurations such that said lateral extremities will inherently seat to directly opposite inner wall surfce portions of the tubular shell-like structure which defines said housing.

16. A portable space heater as in claim 5 wherein said motor and said transformer are fixed to said plate so one thereof is directly aligned with the other.

17. A portable space heater as in claim 5 wherein said laterally projected end portions of said plate are configured for a slip fit placement thereof on circularly spaced portions of the arcuate inner wall surface of said tubular shell.

18. A portable heater including means defining a combustion chamber having a fuel tank in connection therewith, means for delivering fuel from said tank to said chamber, means effective on energization thereof to ignite the delivered fuel for burning thereof in said chamber, means the operation of which is effective to deliver air to and about said combustion chamber to support combustion and be heated thereby, means for energizing the ignition means and operating said air delivery means, a housing peripherally encompassing said means defining said combustion chamber and forming therewith a passage for air delivered about said chamber to be heated thereby, said housing having openings to each of its opposite ends which respectively include an air inlet to and an air outlet from said housing, a motor and a transformer embodied in said heater mounted by support means generally in line with and to the rear of said combustion chamber, said motor and transformer providing said energizing and said operating means for said ignition and said air delivery means when suitably connected to a source of power, the motor and transformer being located in the vicinity of said air inlet and being held by their support means in an elevated relation to and substantially clear of underlying structure and adjacent surfaces and to provide substantially free passage for air to move thereby to opposite sides thereof whereby on connection of said motor and transformer to a source of power, said air delivery means will induce a flow of air to move to, through and from said housing and in the process produce an insulating layer of air moving in enveloping relation to the motor and transformer, said layer of air being effective to separate the motor and transformer from said housing and adjacent structure except for the connection afforded by said support means, said housing being a generally tubular structure, said means defining said combustion chamber being positioned in one end of said tubular structure to have its discharge end position adjacent said outlet from said housing, said motor and said transformer and the support means therefor being positioned at the opposite end of said tubular structure adjacent said inlet, and said support means having a plate form embodying means to determine a horizontal position thereof in a slip fit placement thereof within said tubular structure, said motor being mounted thereby in a generally centered relation to said tubular structure, in a transverse sense, and said transformer being connected directly below said motor as well as clear of said tubular structure.

19. A portable heater as in claim 18 characterized in that means provide a connection of said housing and said fuel tank which position said fuel tank below said housing, in spaced relation thereto and to said transformer.

20. A portable heater as in claim 19 characterized in that said transformer includes primary and secondary windings the secondary of which is comprised of a plurality of windings which are series related.

* * * * *

UNITED STATES PATENT AND TRADEMARK OFFICE
CERTIFICATE OF CORRECTION

PATENT NO. : 4,089,642
DATED : May 16, 1978
INVENTOR(S) : Eugene C. Briggs; Shekhar Chakrawarti; William C. Wellbaum; and Robert F. Shaftner It is certified that error appears in the above-identified patent and that said Letters Patent are hereby corrected as shown below:

Col. 2, line 33, "numrals" is corrected to read -- numerals --;

line 37, -- Letters Patent -- is inserted following "U.S.";

line 63, "will" is corrected to read -- while --.

Col. 4, line 54, "re-" is corrected to read -- ac- --.

Col. 6, line 25, "14" is corrected to read -- 104 --.

Col. 8, line 46, "in" is corrected to read -- is --;

line 48, "details" is corrected to read -- detail --.

Col. 9, line 15, (Claim 1, line 21) "supported" is corrected to read -- support --;

line 67, (Claim 4, line 24), -- said -- is to be inserted following "for".

UNITED STATES PATENT AND TRADEMARK OFFICE
CERTIFICATE OF CORRECTION

PATENT NO. : 4,089,642

DATED : May 16, 1978

INVENTOR(S) : Eugene C. Briggs; Shekhar Chakrawarti; William C. Wellbaum; and Robert F. Shaftner It is certified that error appears in the above-identified patent and that said Letters Patent are hereby corrected as shown below:

Col. 11, line 33, (Claim 10, line 9) "seconary" is corrected to read -- secondary --;

line 42, (Claim 11, line 5) "of" (second occurrence) is corrected to read -- to --;

line 59, (Claim 14, line 1) "on" is corrected to read -- in --.

Col. 12, line 14 (Claim 15, line 7) "surfce" is corrected to read -- surface --.

Signed and Sealed this

Tenth Day of October 1978

[SEAL]

Attest:

RUTH C. MASON
*Attesting Officer*

DONALD W. BANNER
*Commissioner of Patents and Trademarks*